(12) United States Patent
Sundaram et al.

(10) Patent No.: US 7,591,879 B2
(45) Date of Patent: Sep. 22, 2009

(54) INTEGRATION OF RAPID CYCLE PRESSURE SWING ADSORPTION WITH REFINERY PROCESS UNITS (HYDROPROCESSING, HYDROCRACKING, ETC.)

(75) Inventors: Narasimhan Sundaram, Fairfax, VA (US); Bal K. Kaul, Fairfax, VA (US); Edward W. Corcoran, Easton, PA (US); Craig Y. Sabottke, Baton Rouge, LA (US); Richard L. Eckes, Madison, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 638 days.

(21) Appl. No.: 11/312,177

(22) Filed: Dec. 20, 2005

(65) Prior Publication Data

US 2006/0174764 A1    Aug. 10, 2006

Related U.S. Application Data

(60) Provisional application No. 60/645,713, filed on Jan. 21, 2005.

(51) Int. Cl.
*B01D 53/02* (2006.01)
(52) U.S. Cl. .................... 95/96; 95/100; 95/103; 96/130
(58) Field of Classification Search .......... 95/96, 95/100, 101, 103; 96/130
See application file for complete search history.

(56) References Cited

U.S. PATENT DOCUMENTS

| 4,194,892 | A | 3/1980 | Jones et al. |
| 5,540,758 | A | 7/1996 | Agrawal et al. |
| 6,406,523 | B1 | 6/2002 | Connor et al. |
| 6,451,095 | B1 | 9/2002 | Keefer et al. |
| 6,488,747 | B1 | 12/2002 | Keefer et al. |
| 6,500,234 | B1 * | 12/2002 | Ackley et al. .................. 95/96 |
| 6,533,846 | B1 | 3/2003 | Keefer et al. |
| 6,565,635 | B2 | 5/2003 | Keefer et al. |
| 6,607,584 | B2 | 8/2003 | Moreau et al. |

OTHER PUBLICATIONS

R. Farrauto, S. Hwang, L. Shore, W. Ruettinger, J. Lampert, T. Giroux, Y. Liu and O. Llinich, "New Material Needs for Hydrocarbon Fuel Processing: Generating Hydrogen for the PEM Fuel Cell," Annual Review of Materials Research, vol. 33: 1-27 (Volume publication date Aug. 2003).

\* cited by examiner

*Primary Examiner*—Robert A Hopkins
(74) *Attorney, Agent, or Firm*—Paul E. Purwin

(57) ABSTRACT

The present invention is a method for operating a rapid cycling pressure swing adsorption (RCPSA) having a cycle time, T, to separate a feed gas into a non-adsorbed gas and tail gas. The method includes the steps of passing the feed gas having a purity of F % at high pressure into a first end of a bed which selectively adsorbs the tail gas and passes the product gas out a second end of the bed for a time, F. The product gas has a purity, P %, and a rate of recovery of R %. Then the bed is cocurrently depressurized for a time, $t_{CO}$, followed by countercurrently depressurizing the bed for a time, $t_{CN}$. The bed is then purged for a time, $t_P$, wherein desorbate (tail gas) is released at the first end of the bed at a pressure greater than 30 psig, Subsequently the bed is repressurized for a duration, $t_{RP}$.

R>80%, P/F≥1.1 or R≥90%, 0<P/F <1.1.

20 Claims, 1 Drawing Sheet

Sketch of RCPSA

FIGURE 1 Sketch of RCPSA
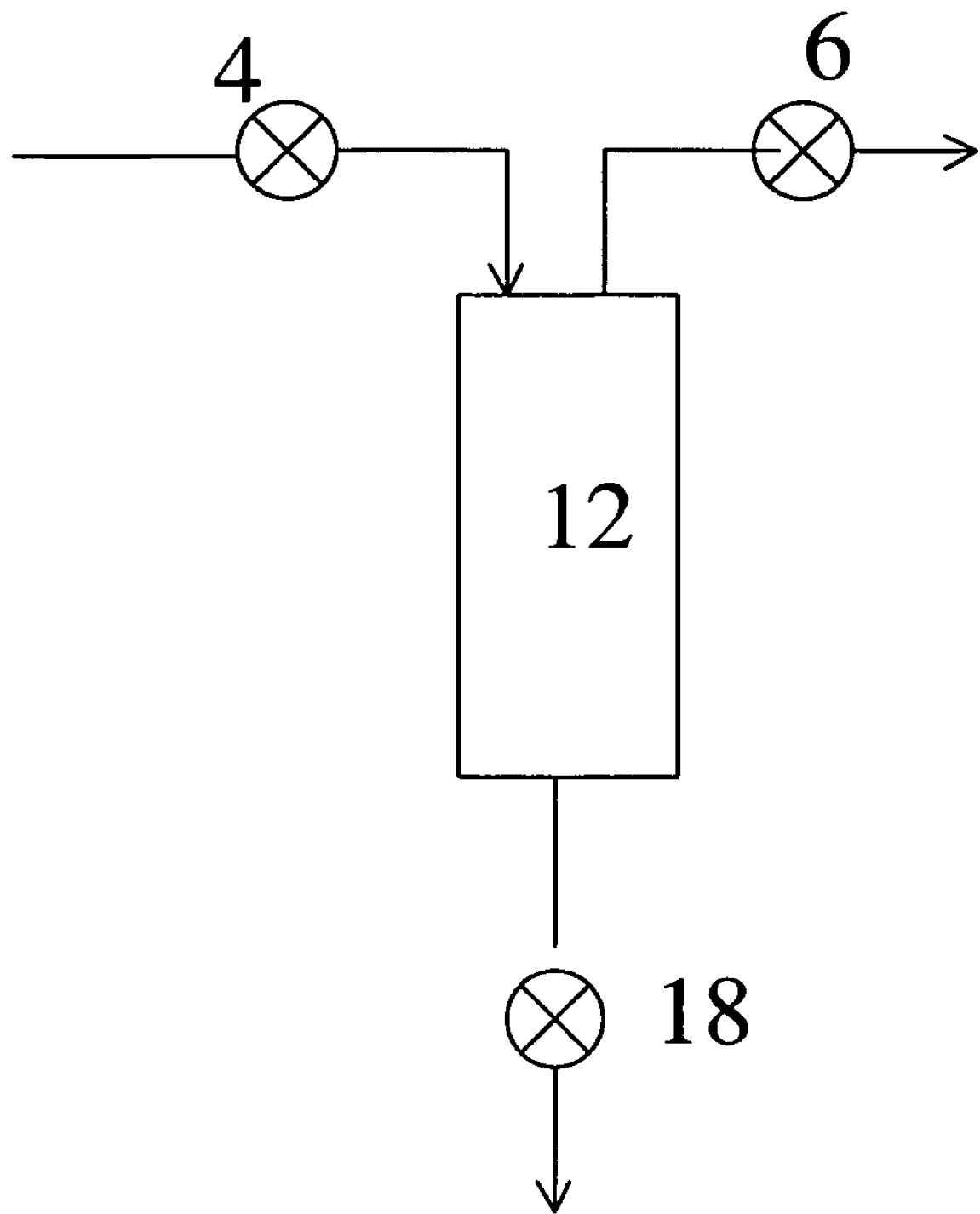

INTEGRATION OF RAPID CYCLE PRESSURE SWING ADSORPTION WITH REFINERY PROCESS UNITS (HYDROPROCESSING, HYDROCRACKING, ETC.)

This application claims the benefit of U.S. Provisional application 60/645,713 filed Jan. 21, 2005.

BACKGROUND OF THE INVENTION

The present invention is a method for operating a rapid pressure swing adsorption unit. In particular, the method operates the rapid pressure swing adsorption unit so that the tail gas (exhaust gas) is released at a pressure greater than 30 psig.

Pressure swing adsorption (PSA) is widely practiced commercially to separate and purify gases, including air separation. Rapid pressure swing adsorption (RCPSA), which operates on shorter cycle times than PSA, can also be used for air separation. The tail gas (adsorbed gas) is emitted from each process at a blowdown pressure, typically 5-15 psig.

In the oil refinery setting, it is often desirable to separate a feed gas into a tail gas (adsorbed gas) and a non-adsorbed gas and send the tail gas to a fuel header or other refinery waste stream that is typically at pressures of 60-80 psig. Therefore, it is desirable that the tail gas be emitted at these higher pressures. Otherwise, a tail gas compressor must be inserted between the separation unit and the fuel header. Purity and/or recovery of the product gas must also be high.

SUMMARY OF THE INVENTION

The present invention is a method for operating a rapid cycle pressure swing adsorption (RCPSA) system having a total cycle time, $t_{TOT}$, to separate a feed gas into product gas and tail (exhaust) gas. The method includes the steps of passing the feed gas having a purity F %, where F is the percentage of the feed gas which is the non-adsorbable component, into a sorbent bed which selectively adsorbs the tail gas and passes the product gas out of the bed, for time, $t_F$, wherein the product gas has a purity of non-adsorbable component P % and a rate of recovery of R %. Recovery R % is the ratio of amount of non-adsorbable component in the product to the amount of non-adsorbable component in the feed. Then the bed is co-currently depressurized for a time, $t_{CO}$, followed by counter-currently depressurizing the bed for a time, $t_{CN}$ wherein desorbate (tail gas or exhaust gas) is released from the bed at a pressure greater than or equal to 30 psig. The bed is purged for a time, $t_P$, typically with a portion of the product gas. Subsequently the bed is repressurized for a time, $t_{RP}$, typically with a portion of product gas or feed gas, wherein the cycle time, $t_{TOT}$, is equal to the sum of the individual cycle times comprising the total cycle time, i.e.

$$t_{TOT} = t_F + t_{CO} + t_{CN} + t_P + t_{RP}$$

The present invention is carried out such that 3 specific ratios are adhered to defined as $$0 < t_{CO}/t_F \leq 1/3, \text{ and}$$

$$t_{CN}/t_F \leq 1/4, \text{ and}$$

$$1/5 \leq t_{CO}/t_P, \text{ and}$$

with conditions resulting such that either (1) the rate of recovery, R %≧80% for a product purity to feed purity ratio, P %/F %≧1.1, and/or (2) the rate of recovery, R %≧90% for a product purity to feed purity ratio, 0<P %/F %<1.1.

The tail gas is released at a pressure high enough so that the tail gas may be fed to another device absent tail gas compression.

In a more preferred embodiment, the tail gas pressure is greater than or equal to 60 psig. In a most preferred embodiment, the tail gas pressure is greater than or equal to 80 psig. The product gas includes hydrogen, methane, an olefin, oxygen, nitrogen, helium, or a saturate. The tail gas may be fed into another unit in a refinery or petrochemical unit such as a hydroprocessing unit, a reforming unit, a fluidized catalytic cracker unit or a methane synthesis unit.

In another preferred embodiment, the only step in depressuring the bed is co-current flow. That is, the counter-current depressurizing step is omitted.

BRIEF DESCRIPTION OF THE DRAWINGS

FIG. 1 shows a schematic diagram of the apparatus for a typical rapid pressure swing adsorption (RCPSA) process.

DETAILED DESCRIPTION OF THE PREFERRED EMBODIMENT

Pressure Swing Adsorption (PSA) is a method that is widely practiced commercially to separate and purify gases. The method consists of five steps performed as a cycle. FIG. 1 shows a schematic drawing of the system to carry out the method. The first step is a feed step wherein mixtures of feed gases at high pressure are passed through valve 4 over adsorbent materials 12 with valve 6 closed and valve 18 open. The material 12 selectively removes components of the mixture, thereby producing a product gas enriched in a preferred component, which passes out valve 18. The second step is a co-current depressurization in which valve 4 is closed and the pressure reduces in adsorbent material 12. Step 3 is a countercurrent depressurizing step in which valve 4 is closed, valve 6 is opened. In this step, the adsorbent material is cleaned by the depressurizing to a lower pressure followed by step 4 of purging at this lower pressure in reverse direction to feed flow. The effluent produced during these steps (3 and 4) is called the tail gas. After these four steps, the adsorbent material is pressurized in step 5 with either the feed or product gas to prepare it for the next feed step. For continuous production, the cycles are practiced using several vessels that undergo different steps of the rudimentary cycle described. In the present invention these five steps are operated in such a manner that the tail gas pressure is high enough to send it to another unit without need of a tail gas compressor.

Rapid pressure swing adsorption (RCPSA) is distinguished from conventional pressure swing adsorption (CPSA) by the shorter cycles times it employs. For example, RCPSA cycle times are typically less than a minute while CPSA cycle times are typically greater than 2-4 minutes. Hardware (valving, piping, configuration of vessels) to perform these cycles also differs considerably and vendors of equipment for both CPSA and RCPSA exist. While CPSA is currently practiced in refineries for recovery of gases such as hydrogen, RCPSA is currently commercially widespread only for air separation. The following examples illustrate the subject matter of the present invention. A computer simulation model of the PSA process is used to determine process performance at different condition.

EXAMPLE 1

In one embodiment of the improved integrations of PSA with a refinery claimed here, an RCPSA to produce an olefin product was compared to CPSA. For example, a computer simulation shows that for the separation of a 65 vol % ethylene—35% ethane stream, 0.16 MMSCFD (million standard cubic feet per day), on 4 A zeolite, RCPSA with 20 sec feed step is able to produce ethylene at greater than 90% purity with ⅙th (one-sixth) the adsorbent quantity needed by a CPSA with a one minute feed step. This particular example is only illustrative of the application of RCPSA to other olefin-paraffin separations.

EXAMPLE 2

In this example, the refinery stream is at 480 psig with tail gas at 65 psig whereby the pressure swing is 6.18. The feed composition and pressures are typical of refinery processing units such as those found in hydroprocessing or hydrotreating applications. In this example typical hydrocarbons are described by their carbon number i.e. C1=methane, C2=ethane etc. The RCPSA is capable of producing hydrogen at >99% purity and >81% recovery over a range of flow rates. Tables 1a,b shows the results of computer simulation of the RCPSA and the input and output percentages of the different components for this example. Table 1a,b also show how the hydrogen purity decreases as recovery is increased from 89.7% to 91.7% for a 6 MMSCFD stream at 480 psig and tail gas at 65 psig.

TABLE 1a,b

Composition (mol %) of input and output from RCPSA (67 ft$^3$) in H2 purification. Feed is at 480 psig, 122 deg F. and Tail gas at 65 psig. Feed rate is about 6 MMSCFD.

| | feed | product | Tail-Gas |
|---|---|---|---|
| Case 1a. Higher purity Step Times in seconds are $t_F = 1, t_{CO} = 0.167, t_{CN} = 0, t_P = 0.333, t_{RP} = 0.5$ H2 at 98.6% purity, 89.7% recovery ||||
| H2 | 88.0 | 98.69 | 45.8. |
| C1 | 6.3 | 1.28 | 25.1 |
| C2 | 0.2 | 0.01 | 1.0 |
| C3 | 2.6 | 0.01 | 12.3 |
| C4+ | 2.9 | 0.00 | 14.8 |
| H2O | 2000 vppm | 65 vppm | 9965 vppm |
| total (MMSCFD) | 6.162 | 4.934 | 1.228 |
| | 480 psig | 470 psig | 65 psig |
| Case 1b. Higher purity Step Times in seconds are $t_F = 1, t_{CO} = 0.333, t_{CN} = 0, t_P = 0.167, t_{RP} = 0.5$ H2 at 97.8% purity, 91.7% recovery ||||
| H2 | 88.0 | 97.80 | 45.9 |
| C1 | 6.3 | 2.14 | 25.0 |
| C2 | 0.2 | 0.02 | 1.0 |
| C3 | 2.6 | 0.02 | 12.3 |
| C4+ | 2.9 | 0.00 | 14.9 |
| H2O | 2000 vppm | 131 vppm | 10016 vpm |
| total (MMSCFD) | 6.160 | 5.085 | 1.074 |
| | 480 psig | 470 psig | 65 psig |

The RCPSA's described in the present invention operate a cycle consisting of different steps. Step 1 is feed during which product is produced, step 2 is co-current depressurization, step 3 is counter-current depressurization, step 4 is purge, usually counter-current) and step 5 is repressurization with product. In the RCPSA's described here at any instant half the total number of beds are on the feed step. Further the time duration of the steps 2 through 5 is equal to the time duration for the entire step 1. Typical step times for the total cycle can be 0.5 s-2 s and even lower. Steps 2-5 are fractions of this time.

TABLE 2

Effect of step durations on H2 purity and recovery from an RCPSA (67 ft$^3$). Same conditions as Table 1. Feed is at 480 psig, 122 deg F. and Tail gas at 65 psig. Feed rate is about 6 MMSCFD.

| purity % | recovery % | $t_F$ s | $t_{CO}$ s | $t_{CN}$ s | $t_P$ s | $t_{RP}$ s |
|---|---|---|---|---|---|---|
| 2a. Without counter-current depress |||||||
| 98.2 | 84.3 | 1 | 0.283 | 0.05 | 0.167 | 0.5 |
| 98.3 | 85 | 1 | 0.166 | 0.167 | 0.167 | 0.5 |
| 99.9 | 80 | 1 | 0.083 | 0.25 | 0.167 | 0.5 |
| 2b. With counter-current depress, Intermediate pressure = 105 psig |||||||
| 97.8 | 91.7 | 1 | 0.333 | 0 | 0.167 | 0.5 |
| 98.7 | 90 | 1 | 0.166 | 0 | 0.334 | 0.5 |
| 99 | 88 | 1 | 0.083 | 0 | 0.417 | 0.5 |

Conditions for Table 2 are the same as in Table 1. Table 2a shows that when there is no counter-current depressurization step, the co-current depress duration should be less than ⅓ rd of feed step time to maintain high purity >99%.

Similarly Table 2b shows that with counter-current depressurization, the total depressurization time should be preferably less than ⅓ rd of feed step time and the counter-current depress time should be less ¼ th of the feed step time to maintain high recovery (>80%).

EXAMPLE 3

This example shows a 10 MMSCFD refinery stream, once again containing typical components, as shown in feed column of Table 3. The stream is at 480 psig with RCPSA tail gas at 65 psig whereby the absolute pressure swing is 6.18. For e.g. the feed composition contains 74% H2. Once again the RCPSA of the present invention is capable of producing hydrogen at >99% purity and >85% recovery from these feed compositions. Tables 3a,b shows the results of this example.

TABLE 3a,b

Composition (mol %) of input and output from RCPSA (53 ft$^3$) in H2 purification. Feed is at 480 psig, 101 deg F. and Tail gas at 65 psig. Feed rate is about 10 MMSCFD.

| | feed | product | Tail-Gas |
|---|---|---|---|
| Case 3a. Higher purity Step Times in seconds are $t_F = 0.583, t_{CO} = 0.083, t_{CN} = 0, t_P = 0.25, t_{RP} = 0.25$ H2 at 99.98% purity and 86% recovery ||||
| H2 | 74.0 | 99.98 | 29.8 |
| C1 | 14.3 | 0.02 | 37.6 |
| C2 | 5.2 | 0.00 | 13.8 |
| C3 | 2.6 | 0.00 | 7.4 |
| C4+ | 3.9 | 0.00 | 11.0 |
| H2O | 2000 vppm | 0.3 vppm | 5387 vppm |
| total (MMSCFD) | 10.220 | 6.514 | 3.705 |
| | 480 psig | 470 psig | 65 psig |

TABLE 3a,b-continued

Composition (mol %) of input and output from RCPSA (53 ft$^3$) in H2 purification. Feed is at 480 psig, 101 deg F. and Tail gas at 65 psig. Feed rate is about 10 MMSCFD.

|  | feed | product | Tail-Gas |
|---|---|---|---|
| Case 3b. Lower purity | | | |
| Step Times in seconds are | | | |
| $t_F = 0.5, t_{CO} = 0.167, t_{CN} = 0, t_P = 0.083, t_{RP} = 0.25$ | | | |
| H2 at 93% purity and 89% recovery | | | |
| H2 | 74.0 | 93.12 | 29.3 |
| C1 | 14.3 | 6.34 | 31.0 |
| C2 | 5.2 | 0.50 | 16.6 |
| C3 | 2.6 | 0.02 | 8.9 |
| C4+ | 3.9 | 0.00 | 13.4 |
| H2O | 2000 vppm | 142 vppm | 6501 vpm |
| total (MMSCFD) | 10.220 | 7.240 | 2.977 |
|  | 480 psig | 470 psig | 65 psig |

In both cases 3a, 3b, although tail gas pressure is high at 65 psig, the present invention shows that high purity (99%) is obtained only when the duration of the co-current depressurization step (5/60 s) is less than 1/3 of the feed step duration (35/60 s).

Tables 2 and 3a show that for both 6 MMSCFD and 10 MMSCFD flow rate conditions, very high purity hydrogen at ~99% and >85% recovery is achievable with the RCPSA. In both cases the tail gas is at 65 psig. Such high purities and recoveries of product gas achieved using the RCPSA with all the exhaust produced at high pressure have not been discovered before and are a key feature of the present invention.

Table 3c shows the results for an RCPSA (volume=49 cubic ft) that delivers high purity (>99%) H2 at high recovery for the same refinery stream discussed in Tables 3a,b. Table 3c. Part a. shows that that high purity H2 is produced when the duration of the co-current depressurization step is less than 1/3 rd of the feed step time, for the case where there is no counter-current depressurization step.

TABLE 3c

Effect of step durations on H2 purity and recovery from an RCPSA (49 ft$^3$). Feed is at 480 psig, 101 deg F. and Tail gas at 65 psig. Feed rate is about 10 MMSCFD. Without counter-current depress

| purity % | recovery % | $t_F$ s | $t_{CO}$ s | $t_{CN}$ s | $t_P$ s | $t_{RP}$ s |
|---|---|---|---|---|---|---|
| 95.6 | 87.1 | 0.5 | 0.167 | 0 | 0.083 | 0.25 |
| 97.6 | 86 | 0.5 | 0.117 | 0 | 0.133 | 0.25 |
| 99.7 | 85.9 | 0.5 | 0.083 | 0 | 0.167 | 0.25 |

EXAMPLE 4

In this example, Table 4 further illustrates the performance of RCPSA's operated in accordance with the invention being described here. In this example, the feed is a typical refinery stream and is at a pressure of 300 psig. The RCPSA of the present invention is able to produce 99% pure hydrogen product at 83.6% recovery when all the tail gas is exhausted at 40 psig. In this case the tail gas can be sent to a flash drum or other separator or other downstream refinery equipment without further compression requirement. In absolute terms the pressure swing in this example is 5.52. Simultaneously the RCPSA also removes CO to <2 vppm, which is extremely desirable for refinery units that use the product hydrogen enriched stream. Lower levels of CO ensure that the catalysts in the downstream units operate without deterioration in activity over extended lengths. Conventional PSA cannot meet this CO specification and simultaneously also meet the condition of exhausting all the tail gas at the higher pressure, such as at typical fuel header pressure or the high pressure of other equipment that processes such RCPSA exhaust. Since all the tail gas is available at 40 psig or greater, no additional compression is required for integrating the RCPSA with refinery equipment. Prior art typically uses compression/expansion via a rotating shaft.

TABLE 4

Composition (mol %) of input and output from RCPSA (4 ft$^3$) in carbon monoxide and hydrocarbon removal from hydrogen. Feed is at 300 psig, 101 deg F., and Feed rate is about 0.97 MMSCFD. Step Times in seconds are $t_F = 0.5$, $t_{CO} = 0.1$, $t_{CN} = 0$, $t_P = 0.033$, $t_{RP} = 0.066$
H2 at 99.99% purity and 88% recovery

|  | feed | product | Tail-Gas |
|---|---|---|---|
| H2 | 89.2 | 99.98 | 48.8 |
| C1 | 3.3 | 0.01 | 13.9 |
| C2 | 2.8 | 0.01 | 13.9 |
| C3 | 2.0 | 0.00 | 10.2 |
| C4+ | 2.6 | 0.00 | 13.2 |
| CO | 50 | 1.1 | 198.4 |
| total | 0.971 | 0.760 | 0.211 |
|  | 300 psig | 290 psig | 40 psig |

EXAMPLE 5

Table 5a,b compares the performance of RCPSA's operated in accordance with the invention being described here. The stream being purified has lower H2 in the feed (51% mol) and is a typical refinery/petrochemical stream. In both cases, 5a, b, a counter current depressurization step is applied after the co-current step. In accordance with the invention, Table 5a shows that high H2 recovery (81%) is possible even when all the tail gas is released at 65 psig or greater. In contrast, the RCPSA where some tail-gas is available as low as 5 psig, loses hydrogen in the counter-current depressurization such that H2 recovery drops to 56%. In addition, the higher pressure of the stream in Table 5a indicates that no tail gas compression is required.

TABLE 5a,b

Effect of Tail Gas Pressure on recovery
Example of RCPSA applied to a Feed with H2 concentration (51.3 mol %) Composition (mol %) of input and output from RCPSA (31 ft$^3$) in H2 purification. Feed is at 273 psig, 122 deg F. and Feed rate is about 5.1 MMSCFD.

|  | feed | product | Tail-Gas |
|---|---|---|---|
| 5a. Step Times in seconds are $t_F = 0.5$, $t_{CO} = 0.083$, $t_{CN} = 0.033$, | | | |
| $t_P = 0.25$, $t_{RP} = 0.133$ | | | |
| [a] Tail gas available from 65-83 psig, H2 at 99.7% purity and 81% recovery | | | |
| H2 | 51.3 | 99.71 | 20.1 |
| C1 | 38.0 | 0.29 | 61.0 |
| C2 | 4.8 | 0.00 | 8.0 |
| C3 | 2.2 | 0.00 | 3.8 |
| C4+ | 3.7 | 0.00 | 6.4 |
| H2O | 4000 vppm | 0.7 vppm | 6643 vppm |
| total (MMSCFD) | 5.142 | 2.141 | 3.001 |
|  | 273 psig | 263 psig | 65-83 psig |

TABLE 5a,b-continued

Effect of Tail Gas Pressure on recovery
Example of RCPSA applied to a Feed with H2 concentration (51.3 mol %)
Composition (mol %) of input and output from RCPSA (31 ft³) in H2
purification. Feed is at 273 psig, 122 deg F. and Feed rate is about
5.1 MMSCFD.

|  | feed | product | Tail-Gas |
|---|---|---|---|
| 5b. Step Times in sec. are $t_F = 0.667$, $t_{CO} = 0.167$, $t_{CN} = 0.083$, $t_P = 0.083$, $t_{RP} = 0.33$ ||||
| [b] Tail gas available from 5-65 psig, H2 at 99.9% purity and 56% recovery ||||
| H2 | 51.3 | 99.99 | 34.2 |
| C1 | 38.0 | 0.01 | 48.8 |
| C2 | 4.8 | 0.00 | 6.9 |
| C3 | 2.2 | 0.00 | 3.4 |
| C4+ | 3.7 | 0.00 | 6.2 |
| H2O | 4000 vppm | 0.0 vppm | 5630 vppm |
| total (MMSCFD) | 5.142 | 1.490 | 3.651 |
|  | 273 psig | 263 psig | 5-65 psig |

EXAMPLE 6

In this example, Table 6a,b compares the performance of RCPSA's operated in accordance with the invention being described here. In these cases, the feed pressure is 800 psig and tail gas is exhausted at either 65 psig or at 100 psig. The composition reflects typical impurities such H2S, which can be present in such refinery applications. As can be seen, high recovery (>80%) is observed in both cases with the high purity >99%. In both these cases, only a cocurrent depressurization is used and the effluent during this step is sent to other beds in the cycle. Tail gas only issues during the countercurrent purge step. Table 6c shows the case for an RCPSA operated where some of the tail gas is also exhausted in a countercurrent depressurization step following a co-current depressurization. The effluent of the co-current depressurization is of sufficient purity and pressure to be able to return it one of the other beds in the RCPSA vessel configuration that is part of this invention. Tail gas i.e., exhaust gas, issues during the counter-current depressurization and the counter-current purge steps.

In all cases the entire amount of tail gas is available at elevated pressure which allows for integration with other high pressure refinery process. This removes the need for any form of rotating shaft machinery or compressor while producing high purity gas at high recoveries. In accordance with the broad claims of this invention, these cases are only to be considered as illustrative examples and not limiting either to the refinery, petrochemical or processing location or even to the nature of the particular molecules being separated.

TABLE 6a,b,c

Example of RCPSA applied to a high pressure feed
Composition (mol %) of input and output from RCPSA (18 ft³) in H2
purification. Feed is at 800 psig, 122 deg F. and Feed rate is about
10.1 MMSCFD.

|  | feed | product | Tail-Gas |
|---|---|---|---|
| 6a. Step Times in sec. are $t_F = 0.91$, $t_{CO} = 0.25$, $t_{CN} = 0$, $t_P = 0.33$, $t_{RP} = 0.33$ ||||
| [a] Tail gas at 65 psig, H2 at 99.9% purity and 87% recovery ||||
| H2 | 74.0 | 99.99 | 29.5 |
| C1 | 14.3 | 0.01 | 37.6 |
| C2 | 5.2 | 0.00 | 14.0 |
| C3 | 2.6 | 0.00 | 7.4 |
| C4+ | 3.9 | 0.00 | 10.9 |
| H2S | 20 vppm | 0 | 55 vppm |
| total (MMSCFD) | 10.187 | 6.524 | 3.663 |
|  | 800 psig | 790 psig | 65 psig |
| 6b. Step Times in seconds are $t_F = 0.91$, $t_{CO} = 0.25$, $t_{CN} = 0$, $t_P = 0.33$, $t_{RP} = 0.33$ ||||
| [b] Tail gas at 100 psig, H2 at 99.93% purity and 80.3% recovery ||||
| H2 | 74.0 | 99.93 | 38.1 |
| C1 | 14.3 | 0.07 | 32.8 |
| C2 | 5.2 | 0.00 | 12.5 |
| C3 | 2.6 | 0.00 | 6.5 |
| C4+ | 3.9 | 0.00 | 9.6 |
| H2S | 20 vppm | 0 vppm | 49 vppm |
| total (MMSCFD) | 10.187 | 6.062 | 4.125 |
|  | 800 psig | 790 psig | 100 psig |
| 6c. Step times in seconds are $t_F = 0.91$, $t_{CO} = 0.083$, $t_{CN} = 0.25$, $t_P = 0.167$, $t_{RP} = 0.41$ ||||
| [c] Tail gas from 65-100 psig, H2 at 99.8% purity and 84% recovery ||||
| H2 | 74.0 | 99.95 | 28.9 |
| C1 | 14.3 | 0.05 | 39.0 |
| C2 | 5.2 | 0.00 | 13.7 |
| C3 | 2.6 | 0.00 | 7.2 |
| C4+ | 3.9 | 0.00 | 10.6 |
| H2S | 20 vppm | 0.01 vppm | 53 vppm |
| total (MMSCFD) | 10.187 | 6.373 | 3.814 |
|  | 800 psig | 790 psig | 65-100 psig |

EXAMPLE 7

Table 7 compares the performance of RCPSA's operated in accordance with the invention being described here. The stream being purified has higher $H_2$ in the feed (85% mol) and is a typical refinery/petrochemical stream. In these examples the purity increase in product is below 10% (i.e. P/F<1.1). Under this constraint, the method of the present invention is able to produce hydrogen at >90% recovery without tail gas compression.

TABLE 7a,b,c

Example of RCPSA applied to a Feed with H2 concentration (85 mol %).
Composition (mol %) of input and output from RCPSA (6.1 ft³).
Feed is at 480 psig, 135 deg F. and Feed rate is about 6 MMSCFD.

|  | feed | product | Tail-Gas |
|---|---|---|---|
| 7a. Step Times in seconds are $t_F = 0.5$, $t_{CO} = 0.33$, $t_{CN} = 0.167$, $t_P = 0.167$, $t_{RP} = 1.83$ ||||
| recovery = 85% ||||
| H2 | 85.0 | 92.40 | 57.9 |
| C1 | 8.0 | 4.56 | 17.9 |
| C2 | 4.0 | 1.79 | 13.1 |
| C3 | 3.0 | 1.16 | 10.4 |
| C4+ | 0.0 | 0.00 | 0.0 |
| H2O | 2000 | 866.5 | 6915 |
| total (MMSCFD) | 6.100 | 4.780 | 1.320 |
|  | 480 psig | 470 psig | 65 psig |
| 7b. Step Times in sec. are $t_F = 1$, $t_{CO} = 0.333$, $t_{CN} = 0.167$, ||||

TABLE 7a,b,c-continued

Example of RCPSA applied to a Feed with H2 concentration (85 mol %).
Composition (mol %) of input and output from RCPSA (6.1 ft³).
Feed is at 480 psig, 135 deg F. and Feed rate is about 6 MMSCFD.

|  | feed | product | Tail-Gas |
|---|---|---|---|
| | $t_P = 0.083, t_{RP} = 0.417$ recovery = 90% | | |
| H2 | 85.0 | 90.90 | 58.2 |
| C1 | 8.0 | 5.47 | 18.1 |
| C2 | 4.0 | 2.23 | 12.9 |
| C3 | 3.0 | 1.29 | 10.1 |
| C4+ | 0.0 | 0.00 | 0.0 |
| H2O | 2000 | 1070.5 | 6823 |
| total (MMSCFD) | 6.120 | 5.150 | 0.969 |
| | 480 psig | 470 psig | 65 psig |
| 7c. Step Times in sec. are $t_F = 2, t_{CO} = 0.667, t_{CN} = 0.333$, $t_P = 0.167, t_{RP} = 0.833$ recovery = 90% | | | |
| H2 | 85.0 | 90.19 | 55.2 |
| C1 | 8.0 | 6.21 | 18.8 |
| C2 | 4.0 | 2.32 | 13.9 |
| C3 | 3.0 | 1.17 | 11.3 |
| C4+ | 0.0 | 0.00 | 0.0 |
| H2O | 2000 | 1103.5 | 7447 |
| total (MMSCFD) | 6.138 | 5.208 | 0.93 |
| | 480 psig | 470 psig | 65 psig |

Prior art exists where some portion of the PSA exhaust gas is removed at an intermediate, elevated pressure. However, in every instance, the PSA is operated such that some exhaust is produced at low (5 psig=20 psia) pressure. Such low pressure exhaust can also contribute to lower recovery since this exhausted gas which, contains larger and larger fractions of the heavy, undesirable components also contains valuable light product, such as hydrogen. This is a consequence of deeper levels of cleaning offered by the larger pressure swing. However it is not fully understood in the art that it is this additional enrichment of heavies that can also lead to lower recovery due to the unavoidable loss of the light component along with vented heavy impurity. This heavy impurity must be vented since it cannot be returned to the RCPSA system and re-used, for example as pressurization gas to pressurize another vessel in the RCPSA undergoing a pressurization step. FIG. 2 shows a comparison of the tail gas pressure of the present invention with the prior art.

Another feature disclosed here is that an RCPSA can operated at high purity and recovery of light product while using only co-current depressurization/blowdown steps, i.e. without resorting to a counter-current blow down step. Such a counter-current blowdown steps is cited in the prior art as a means to generate energy recovery by using a portion of the counter-current exhaust to drive a separate item of machinery called a turboexpander. Such turboexpanders then can simultaneously drive a compressor operating on the same shaft. In this manner the prior art claims to reduce the compression requirements. As is evident no such device is required in the

| case # | EXAMPLE # | Tail gas P psig | F Feed Purity % | P Product Purity % | P/F PURITY RATIO | R recovery % | $t_{CO}/t_F$ cocurrent/ feed ratio | $t_{CN}/t_F$ countercurrent/ feed ratio | | $t_{CO}/t_P$ (cocurrent/ purge) ratio |
|---|---|---|---|---|---|---|---|---|---|---|
| Table 8a Purity ratio (P/F) ≥ 1.1 | | | | | | | | | | |
| 1 | 3 | 65 | 74 | 99.9 | 1.35 | 74 | 1 | 1 | prior art | 1.000 |
| 2 | 3 | 65 | 74 | 99 | 1.34 | 73 | 0.5 | 0.5 | not according to invention | 1.000 |
| 3 | 3 | 65 | 74 | 84 | 1.14 | 74 | 0.5 | 0.25 | not according to invention | 0.500 |
| 4 | 3 | 65 | 74 | 85 | 1.15 | 76 | 0.45 | 0.1 | not according to invention | 0.450 |
| 5 | 3 | 65 | 74 | 99 | 1.34 | 70 | 0.333 | 0.333 | not according to invention | 0.500 |
| 6 | 3 | 65 | 74 | 99 | 1.34 | 68 | 0.1 | 0.1 | not according to invention | 0.150 |
| 7 | 2 | 65 | 88 | 99.9 | 1.14 | 80 | 0.083 | 0.25 | preferred | 0.498 |
| 8 | 3 | 65 | 74 | 99 | 1.34 | 81 | 0.1 | 0.1 | preferred | 0.300 |
| 9 | 5 | 65 | 51 | 99 | 1.94 | 81 | 0.167 | 0.067 | preferred | 0.279 |
| 10 | 2 | 65 | 88 | 98.3 | 1.12 | 85 | 0.167 | 0.167 | preferred | 1.002 |
| 11 | 2 | 65 | 88 | 98.2 | 1.12 | 84.3 | 0.28 | 0.05 | preferred | 1.680 |
| 12 | 2 | 65 | 88 | 97.8 | 1.11 | 91.7 | 0.333 | 0 | preferred | 1.998 |
| 13 | 3 | 65 | 74 | 93 | 1.26 | 89 | 0.333 | 0 | preferred | 1.998 |
| 14 | 3 | 65 | 74 | 95.6 | 1.29 | 87.1 | 0.333 | 0 | preferred | 1.998 |
| 15 | 3 | 65 | 74 | 97.6 | 1.32 | 86 | 0.23 | 0 | preferred | 0.8625 |
| 16 | 6 | 100 | 74 | 99 | 1.34 | 80 | 0.27 | 0 | preferred | 0.743 |
| 17 | 3 | 65 | 74 | 99 | 1.34 | 84 | 0.27 | 0 | preferred | 0.743 |
| 18 | 3 | 65 | 74 | 99.7 | 1.35 | 85.9 | 0.167 | 0 | preferred | 0.501 |
| 19 | 2 | 65 | 88 | 98.6 | 1.12 | 89.7 | 0.167 | 0 | preferred | 0.501 |
| 20 | 3 | 65 | 74 | 99.9 | 1.35 | 86 | 0.14 | 0 | preferred | 0.328 |
| 21 | 2 | 65 | 88 | 99 | 1.13 | 88 | 0.08 | 0 | preterred | 0.200 |
| Table 8b Purity ratio (P/F) < 1.1 | | | | | | | | | | |
| 1 | 7 | 65 | 85 | 92.6 | 1.09 | 85 | 0.833 | 0.333 | not according to invention | 5.000 |
| 2 | 7 | 65 | 85 | 92.4 | 1.09 | 85 | 0.667 | 0.333 | not according to invention | 2.000 |
| 3 | 3 | 65 | 74 | 79 | 1.07 | 85 | 0.625 | 0.2 | not according to invention | 1.000 |
| 4 | 7 | 65 | 85 | 90 | 1.06 | 90 | 0.333 | 0.167 | preferred by invention | 4.000 |
| 5 | 7 | 65 | 85 | 91 | 1.07 | 90 | 0.333 | 0.167 | preterred by invention | 4.000 |

Tables 8a,b, summarise cases from the examples used to illustrate the invention in terms of the specific ratios of step durations described earlier.

present invention since all the exhaust gas is available at the elevated pressure thereby eliminating any rotational compressor device such as rotating shaft. In addition, by controlling the duration of the co-current blowdown step such that co-current blowdown gas issuing from the product end (i.e. co-current to feed step) does not drop in purity below a specified amount, typically the feed composition, then all the co-current blow-down gas can be used to pressurize other beds in the RCPSA cycle. This features greatly conserves light product and increases recovery of light product.

What is claimed is:

1. A method for operating a rapid cycle pressure swing adsorption (RCPSA) system having a cycle time, $t_{TOT}$, to separate a feed gas into product gas and tail (exhaust) gas with a high rate of recovery, comprising:
   (a) passing said feed gas having purity F % into a sorbent bed for time, $t_F$, which selectively adsorbs said tail gas and passes said product gas out of said bed, wherein said product gas has a purity of P % and a rate of recovery of R %,
   (b) co-currently depressurizing said bed for a time, $t_{CO}$,
   (c) counter-currently depressurizing said bed for a time, $t_{CN}$,
   (d) purging said bed for a time, $t_P$, wherein desorbate (tail gas or exhaust gas) is released from said bed at a pressure greater than 30 psig, and
   (e) repressurizing the bed for a time, $t_{RP}$, wherein
the cycle time, $t_{TOT}$, is equal to the sum of the individual cycle times comprising the total cycle time, $$t_{TOT} = t_F + t_{CO} + t_{CN} + t_P + t_{RP}$$

and, wherein $$0 < t_{CO}/t_F \leq 1/3, \text{ and}$$

$$t_{CN}/t_F \leq 1/4, \text{ and}$$

$$1/5 \leq t_{CO}/t_P,$$

such that
the rate of recovery, R %>80% for a product purity to feed purity ratio, P %/F %≧1.1, and/or a rate of recovery, R %>90% for a product purity to feed purity ratio, 0<P %/F %<1.1.

2. The method of claim 1 wherein said tail gas has a pressure greater than 60 psig.

3. The method of claim 1 wherein said product gas includes hydrogen.

4. The method of claim 1 wherein said product gas includes methane.

5. The method of claim 1 wherein said product gas includes an olefin.

6. The method of claim 1 wherein said product gas includes oxygen.

7. The method of claim 1 wherein said product gas includes nitrogen.

8. The method of claim 1 wherein said product gas includes helium.

9. The method of claim 1 wherein said product includes a saturate.

10. The method of claim 1 wherein said product includes $CO_2$.

11. The method of claim 1 wherein said purity of said product gas is greater than 90%.

12. The method of claim 1 wherein said purity of said product gas is greater than 95%.

13. The method of claim 1 wherein said purity of said product gas is greater than 99%.

14. The method of claim 1 wherein the tail gas (exhaust gas) pressure is greater than 80 psig.

15. The method of claim 1 wherein the rate of recovery, R %≧85% for a product purity to feed purity ratio, P %/F %≧1.1, and/or a rate of recovery, R %≧95% for a product purity to feed purity ratio, 0<P %/F %<1.1.

16. The method of claim 1 wherein the rate of recovery, R %≧90% for a product purity to feed purity ratio, P %/F %≧1.1, and/or a rate of recovery, R %≧98% for a product purity to feed purity ratio, 0<P %/F %<1.1.

17. The method of claim 1 further comprising the step of feeding said tail gas into a refinery or petrochemical unit absent a tail gas compression.

18. The method of claim 17 wherein said refinery unit is a hydroprocessing unit, a reforming unit or a fluidized catalytic cracker unit.

19. The method of claim 17 wherein said petrochemical unit is a methanol synthesis unit.

20. The method of claim 1 wherein said step of depressuring said bed is only cocurrent flow such that $t_{CN}=0$.

* * * * *